United States Patent
Lhoest et al.

(10) Patent No.: US 11,905,572 B2
(45) Date of Patent: Feb. 20, 2024

(54) KILN COMPRISING A CONTROL UNIT ASSOCIATED WITH THE THERMAL INERTIA PROPERTIES OF CONSTITUTIVE ELEMENTS

(71) Applicant: DREVER INTERNATIONAL SA, Liège (BE)

(72) Inventors: Alexandre Lhoest, Eupen (BE); Daniel Martins, Sprimont (BE)

(73) Assignee: DREVER INTERNATIONAL SA, Liège (BE)

( * ) Notice: Subject to any disclaimer, the term of this patent is extended or adjusted under 35 U.S.C. 154(b) by 376 days.

(21) Appl. No.: 16/954,713

(22) PCT Filed: Dec. 20, 2018

(86) PCT No.: PCT/EP2018/086421
§ 371 (c)(1),
(2) Date: Jun. 17, 2020

(87) PCT Pub. No.: WO2019/122252
PCT Pub. Date: Jun. 27, 2019

(65) Prior Publication Data
US 2021/0087651 A1  Mar. 25, 2021

(30) Foreign Application Priority Data
Dec. 20, 2017 (BE) .................................. 2017/5965

(51) Int. Cl.
*C21D 9/60* (2006.01)
*C21D 11/00* (2006.01)
(Continued)

(52) U.S. Cl.
CPC ............... *C21D 9/60* (2013.01); *C21D 11/00* (2013.01); *F27B 9/067* (2013.01); *F27B 9/28* (2013.01);
(Continued)

(58) Field of Classification Search
CPC . C21D 9/60; C21D 11/00; F27B 9/067; F27B 9/28; F27B 9/40; F27D 19/00; F27D 2019/0025
See application file for complete search history.

(56) References Cited

U.S. PATENT DOCUMENTS 3,385,946 A * 5/1968 Hatchard ................ F27D 11/06
219/601
5,770,838 A   6/1998 Rohrbaugh et al.
(Continued)

FOREIGN PATENT DOCUMENTS

| GB | 1151243 A | 5/1969 |
|----|-----------|--------|
| JP | H06108317 A | 4/1994 |
| JP | 5000116 B2 | 8/2012 |

OTHER PUBLICATIONS

International Search Report dated Feb. 21, 2019, issued in corresponding International Application No. PCT/EP2018/086421, filed Dec. 20, 2018, 7 pages.
(Continued)

*Primary Examiner* — Scott R Kastler
(74) *Attorney, Agent, or Firm* — Christensen O'Connor Johnson Kindness PLLC

(57) ABSTRACT

A furnace for the heat treatment of a metal product includes constitutive elements, each having a thermal inertia property determined from physical parameters. The constitutive elements include walls delimiting at least partially the furnace, a heating unit for heating the metal product, and a rapid heating element for heating the metal product. The furnace also includes a control circuit for controlling the heating unit and/or the rapid heating element, based on one or more thermal inertia properties of one or more constitutive elements of the furnace, and at least based on a ground of a constitutive element of said furnace.

16 Claims, 3 Drawing Sheets

(51) Int. Cl.
  *F27B 9/06* (2006.01)
  *F27B 9/28* (2006.01)
  *F27B 9/40* (2006.01)
  *F27D 19/00* (2006.01)

(52) U.S. Cl.
  CPC ............... *F27B 9/40* (2013.01); *F27D 19/00* (2013.01); *F27D 2019/0025* (2013.01)

(56) References Cited

U.S. PATENT DOCUMENTS

| | | | | |
|---|---|---|---|---|
| 5,827,056 A | * | 10/1998 | Rohrbaugh | ............ F26B 21/10 148/657 |
| 6,259,071 B1 | * | 7/2001 | Demidovitch | ..... G05D 23/1902 148/698 |
| 2021/0087651 A1 | * | 3/2021 | Lhoest | ................... C21D 11/00 |

OTHER PUBLICATIONS

Written Opinion of the International Searching Authority dated Feb. 21, 2019, issued in corresponding International Application No. PCT/EP2018/086421, filed Dec. 20, 2018, 11 pages.

* cited by examiner

KILN COMPRISING A CONTROL UNIT ASSOCIATED WITH THE THERMAL INERTIA PROPERTIES OF CONSTITUTIVE ELEMENTS

TECHNICAL FIELD

Embodiments of the present disclosure relate to a furnace for the heat treatment of metal strip(s) or part(s) by moving.

BACKGROUND

Document U.S. Pat. No. 5,770,838 describes a furnace for heating metal parts capable of controlling the temperature of the sections of the furnace according to predetermined strip temperature ranges. Heating in this particular type of furnace is ensured by radiant heating tubes, as well as a heat section by induction composed of several elements. Controlling the temperature is based on temperature measurements of zones of the furnace.

Induction heating devices used in addition to the radiant heating tubes make it possible to vary the temperature of a metal part vary inside the furnace faster than the radiant heating tubes. Induction heating devices are often controlled by a control mechanism, different from that of the radiant heating tubes. Induction heating devices are known for allowing a better control of the strip temperature exiting the heating zone of the furnace.

In the state of the art presented in U.S. Pat. No. 5,770,838, the induction heating devices allow a controlled energy input, so as to reach, during the transients, the desired strip temperatures exiting the furnace. During transitional phases of moving products having different properties, the furnace control described by U.S. Pat. No. 5,770,838 does not allow to consider the instantaneous energy input of the elements of the furnace, other than the power supplied to the heating devices of the furnace. It ensues that controlling the temperature of the moving metal strips and/or products is not optimal. A problem to be resolved is therefore to allow a better control of the energy input delivered by a furnace to a moving metal product.

SUMMARY

According to a first aspect, one of the aims of the disclosure is to provide a furnace presenting a better control of the temperature of the moving metal strips and/or products.

For this purpose, the inventors propose a furnace for the heat treatment of a metal product by moving and comprising constitutive elements each having a thermal inertia property (for example, determined from physical parameters), the constitutive elements comprising:
  walls delimiting at least partially the furnace;
  a heating unit for heating a metal product when the latter is at least partially in the furnace;
  a rapid heating element for heating a metal product when the latter is at least partially in the furnace, the rapid heating element being distinct from the heating unit;
  the furnace further comprising:
  a control unit for controlling the heating unit and/or the rapid heating element based on one or more thermal inertia properties of one or more constitutive elements of the furnace, and at least based on a mass of a constitutive element of the furnace.

The advantages of the furnace according to the disclosure are:
  to allow a better control of the energy exchanged in a furnace in order to reach fixed strip temperatures, which are determined by the target quality aims for a moving metal strip;
  to consider a heat quantity stored by a constitutive element of the furnace, or which will be stored in transitional provisional management by a constitutive element of the furnace. Thermal inertia property could be called or named by inertial parameter or heat exchange inertial parameter.

An overall management of the energy input is based on the determination of physical parameters of a constitutive element of the furnace and in particular at least one thermal inertia property of a constitutive element of the furnace. The importance of considering the physical parameters of elements having a thermal inertia for controlling the furnace in order to control the aimed for strip quality, is that the constitutive elements of the furnace involve an additional energy transfer for a generally long time. An energy transfer being, for example, a heat exchange. The means for determining the physical parameters of the elements having a thermal inertia constituting the furnace allow in particular for a monitoring over time of the energy impacts of the constitutive elements of the furnace having a thermal inertia. The control unit (i.e., a control circuit) is configured to control the constitutive element(s) of the furnace and, in particular, at least one heating unit and a rapid heating element to make the temperature of a metal product vary, after having considered the energy impact of the constitutive elements of the furnace having a thermal inertia on the overall process of heat exchange of the furnace, allows to define and send an online instruction (discrete or continuous) to the heating unit and the rapid heating element to make the temperature of a metal product vary in the furnace. This instruction allows a better control of the energy input and/or withdrawal which takes place in the furnace in order to achieve the quality aim of the moving product. An advantage of the invention is to allow a control of the energy input delivered by a furnace in its entirety to a moving metal product.

According to a possible embodiment of the disclosure, the control unit of the furnace is capable of controlling the at least one heating unit and the rapid heating element only based on a mass of a constitutive element of the furnace. Examples of thermal inertia properties of a constitutive element of the furnace are: a mass, a temperature, a specific heat (or specific heat capacity). It could also be said that the mass, temperature and specific heat of a constitutive element of the furnace are physical parameters which make it possible to determine a thermal inertia property of the constitutive element. Thus, according to certain possible embodiments of the disclosure, the control unit of the furnace according to the disclosure is capable of controlling the at least one heating unit and the rapid heating element based on a mass of a constitutive element of the furnace and/or a temperature and/or a specific heat capacity of one or more constitutive elements of the furnace.

A main advantage of the disclosure is to allow a better temperature control for the heat treatment of a moving metal strip and/or product. The furnaces of the state of the art do not allow as fine a control at the level of the thermal inertia of the constitutive elements of the furnace. Thus, the furnaces of the state of the art do not make it possible to consider a thermal inertia property by the control unit of the furnace. The furnaces of the state of the art are, for example, limited to measuring a roll temperature which is compared to a strip temperature such that the roll temperature is adjusted to the strip temperature. Such furnaces do not allow a good wealth in controlling the strip temperature for a heat treatment, as such furnaces do not consider a thermal inertia property of a constitutive element of the furnace. The consideration of a thermal inertia property of a constitutive element of the furnace by the control unit allows to anticipate variations in sought strip temperatures by acting on the active heating elements, while the furnaces of the state of the art simply make it possible to regulate a setpoint temperature of a constitutive element of the furnace with delays that a regulation system causes. Thus, the disclosure has the advantage of allowing a quicker and better controlled variation of a strip temperature, which is particularly useful in terms of strip length yield treated with the temperature(s) aimed at, for the heat treatment.

Preferably, one of the aims of the present disclosure is to provide a furnace equipped with a system for controlling the strip temperature and/or one or more parameters representative of the quality aimed at allowing a management integrating the energy exchanges through the constitutive elements of the furnace and, in particular, by radiant heating tubes or radiant heating tubes present in the case of indirect heat exchanges, as well as, for example, other equipment such as the rolls, the walls, the arch, the base, etc., which comprise significant inertial factors that are also found in the case of other types of furnaces as in the case of direct flame furnaces, electric heating furnaces, etc. For example, the rolls, the walls, the arch and the base of a furnace with radiant elements can be considered as elements having a significant thermal inertia, in addition to the radiant heating tubes themselves. For the furnaces with no radiant element, the inertial factor of the radiant elements is non-existent, but the other factors remain. The walls of the furnace comprise, for example, the walls, the arch and the base of the furnace. For example, a temperature of a radiant heating tube such as an electric resistance or a radiant tube can be considered as a thermal inertia property in the scope of the disclosure. For example, a roll temperature and more specifically, a roll center or edge temperature can be considered as a thermal inertia property in the scope of the disclosure. A cooling circuit with a fan-motor assembly and possibly a heat exchanger can be considered as a thermal inertia property in the scope of the disclosure.

Preferably, determining and considering the thermal inertia properties by the control unit allow to define instructions to the constitutive elements of the furnace and in particular, the heating unit and the rapid heating element to make the temperature of a metal part vary in the furnace. For example, a furnace zone comprising a plurality of elements, for example radiant heating tubes, by in addition considering the power supplied to these radiant heating tubes, one or more thermal inertia properties of the equipment of the furnace allows the control unit to define and send instructions allowing to have operating points which are better controlled than by simply considering the power supplied to the radiant heating tubes which will be transmitted to the product. This presents multiple advantages and in particular, that of allowing an adjustment of the more precise operating points integrating the furnace in its entirety during the moving product change having features and/or different targets in the furnace and/or a change in operating regime, thus defining a transition of products and/or a regime transition. A transition designates during a passage of a first product to a second product, a change of the operating point of the installation. A transition can be particularly expensive if a portion of a product not having been able to be thermally treated in its quality limits must be considered as waste at the end of heat treatment in a partial or total manner.

A furnace is generally composed of several sections, for example heating, maintenance, cooling sections, etc., each of its product target quality functionalities and aims. A section can be divided into subsections. Preferably, the furnace comprises one or more heating units. Preferably, each section comprises one or more heating units. Preferably, the furnace comprises one or more control units for controlling one or more heating units and/or one or more rapid heating elements. Preferably, several control units make it possible to control several distinct pass sections or lines.

The disclosure can thus be adapted to any type of furnace by means of sensors, for example, temperature sensors allowing the consideration of the thermal inertia properties of the constitutive elements of furnaces. A sensor can be a virtual sensor of which the value can also be determined by calculation, thus allowing the control unit to send to the heating unit and to the rapid heating element to vary the temperature of a product in the furnace from the instructions considering the thermal inertia properties. The consideration of the thermal inertia properties makes it possible to refine the transitions, to minimize or to avoid transitions outside of tolerances and/or to enable transitions with more expanded variations of product parameters. For example, this allows for the use of operating point and/or target temperature differences between two more expanded strips.

Preferably, the furnace of the disclosure is configured for the heat treatment of a moving metal product or of several moving metal products. The fact that a metal product is at least partially in the furnace does not mean that the metal product is static in the furnace, the metal product is preferably moving in the furnace when it is at least in part therein.

Preferably, the furnace comprises first means for determining a zone temperature of the furnace or an exchanged power to estimate an operating point of the furnace. The constitutive elements of the furnace are controlled by the control unit directly or indirectly. The radiant heating tubes, are for example supplied with combustible gas, the gas flow entering into the radiant heating tube or radiant tube is controlled by a valve for controlling the gas. For example, this control valve is a solenoid valve controlled by the control unit. For example, this control valve is a modulating valve controlled by the control unit.

A metal product is for example, a succession of metal parts or strips generally unwound from coils and threaded for a continuous treatment in a furnace. The products can be contiguously linked, such as for example the coil tails could be welded to the following coil heads and form a continuous strip. Or the products can be close to one another at the point that their heads and tail undergo similar conditions in the furnaces during their treatment.

Preferably, the constitutive elements having a thermal inertia of the furnace are elements which have the feature of storing and returning a non-negligible quantity of heat with respect to elements not considered as elements having a thermal inertia.

Generally, the thermally active elements of the furnace, i.e. allowing a non-negligible heat exchange and having a low or a high thermal inertia are means which allow to reach a desired strip temperature. In the scope of the disclosure, the instructions of the control unit, considering thermal inertia properties or thermal (heat exchange) inertia parameters, as well as powers exchanged by the constitutive elements of the furnace or of the temperatures of active elements in the exchanges (for example, radiating radiant tubes, cooling fluid temperatures) of the furnace make it possible to reach the aim(s) of the predefined strip temperature and/or quality. A furnace can be divided into sections, each section having a strip temperature aim, whether by heating, maintaining or cooling. Preferably, a product target temperature is defined by a target temperature range. Preferably, a product target temperature range corresponds to given product quality aims. The consideration of the thermal inertia parameters makes it possible to refine the instructions in order to make it possible to obtain target temperature ranges as reduced as possible and preferably centered or comprising the target strip temperature. The constitutive elements of the furnace being active and/or passive from the standpoint of heating power. The passive elements being, for example, the walls, the rolls of the furnace. The passive elements do not have the property of being able to generate the heat (by combustion, electric resistance, induction), but have the property of being able to store it and being able to return it.

For example, a thermal inertia property is a property which characterizes a resistance to change of temperature of a constitutive element of the furnace when the latter is subjected to a heat or cold source. A thermal inertia property can be comprised as a heat exchange inertia parameter.

The thermal inertia properties are determined based on physical parameters: mass, temperature, specific heat (also called specific heat capacity). Other examples of physical parameters are: thickness of a wall, radial thickness of a roll, dimensions of a constitutive element of the furnace.

Preferably, one or more thermal inertia properties of one or more constitutive elements of the furnace, are determined based on several masses of several constitutive elements of the furnace.

A thermal inertia property preferably relates to a quantity of energy, to a given material, to a given mass, to a given temperature, to a given position in a furnace and having given heat exchange parameters.

Preferably, the at least one constitutive element of the furnace defining the thermal inertia property, has a heat exchange capacity mainly defined by at least one following heat transfer mode: convection, conduction, direct or indirect thermal radiation, phase transformation.

Preferably, the heat transfer between a roll of the furnace and a metal product can be done mainly by conduction and by any other abovementioned mode. Preferably, the heat transfer between a wall and a metal product is done by convection, indirect thermal radiation or by any other abovementioned mode. Preferably, the heat transfer between a heating unit is done mainly by direct thermal radiation and possibly by convection or any other abovementioned mode. Preferably, cooling means can be used to transfer the heat from the metal product to the cooling means by phase transformation, for example with the use of pentane.

A heat exchange capacity by direct thermal radiation is for example, a flame, an indirect heat exchange capacity is, for example, a radiant heating device (radiant heating tube), or a device wherein a hot or cold element, according to what is sought to be heated or cooled, circulates. A furnace element, for example a radiant heating device having a sensitive mass and thermally exchanging presents a sensitive thermal inertia compared with a constitutive element of the furnace bringing into play low masses and/or inducing a low, intrinsic temperature change of the equipment, such as for example a rapid heating device, for example by induction. For example, a direct flame heating, only having to heat a little (or not) any specific mass can, in a radiant tube furnace, be considered as rapid.

Preferably, the at least one device comprises a rapid heating element to make the temperature of a metal product vary.

Preferably, the rapid heating element(s) to make the temperature of a metal product vary, have a low thermal inertia, i.e. that they are not inertially present or that they generate negligible inertial effects compared with the inertial effects of the indirect radiant tube type heating elements or certain portions of the furnace, such as for example the rolls, the walls of the furnace or the exchangers. For example, a rapid heating element to make the temperature of a metal product vary, is a direct flame heating, this needing to not heat, or slightly heat any mass does not generate or hardly generates inertia compared with a radiant tube furnace.

For example, a rapid heating element to make the temperature of a metal product vary is put at the start of the furnace: before a preheating, after a preheating, possibly before the products to be treated reach a physico-chemical parameter such as the curie point. In a preferred embodiment of the disclosure, for example an already-existing furnace for which it is possible to install the present disclosure there, this furnace can have constitutive elements of the furnace of which at least one constitutive element is a rapid heating element to make the temperature of metal product vary. For example, a rapid heating element to vary the temperature of a product is a slightly inertial heating element.

Preferably, the furnace according to the disclosure comprises a first rapid heating element to make the temperature of a metal product vary and a second device, in particular a radiant heating element, having thermal inertia properties considered by the control unit.

A rapid heating element to make the temperature of a metal product vary is, for example, an inducer, a direct flame or also a cooling element/device which, for example, controls a solenoid valve all or not at all controlling the passage of a fluid in elements allowing a heat exchange with the elements of the furnace and/or the metal product in the furnace.

For example, a radiant tube furnace has, in the heating section, a cooling by convection device, which is a rapid device with different inertial parameters.

For example, a cooling element comprises two main inertial parameters: 1. by cooling by forced convection, the increase/fall in speed of the fan/motor assemblies; 2. the typically gas/water exchangers of which the operating point will change have their specific inertia. The combination of water ramps, with immediate effect, with convection cooling linked to the slower fan/motor assemblies and possibly linked to heat exchangers gives a solution with equipment having different inertial parameters.

An advantage of having a rapid heating element to make the temperature of a metal product vary is to make it possible to minimize the transient times/lengths.

Preferably, the rapid heating element is an induction heating element to make the temperature vary by induction of a metal product.

The rapid heating elements to make the temperature of a metal product vary, in this particular case by induction, allow for more dynamic control of the temperature of the strip over time and over relatively short distances compared with, for example, radiant heating elements. In the case of a furnace equipped with radiant elements (heating tubes), these do not allow easy control of the temperature over time through their greater inertia and often require greater strip distances.

Preferably, a rapid heating element to make the temperature of a metal product vary or a rapid heating element to make the temperature vary by induction of a metal product is positioned upstream from at least one constitutive element of the furnace of radiant heating tube type. Upstream relates to the moving of the strip. Upstream means that a portion of the strip first passes in the proximity of the rapid heating element then in the proximity of the constitutive heating element of the radiant heating tube type furnace. An interest of putting the inducer upstream, is to put it in an even colder zone of the furnace, which is constructively and/or operationally easier. In terms of managing transients, there would be more interest in putting the inducer as far as possible on the path of the product in a heating section, but typically before the curie point for functional inducers only with magnetic products, or after the curie point if the technology of the inducer allows for this such as with transversal inducers.

Preferably, the control unit is capable of controlling the heating unit and/or the rapid heating element based on a temperature of a constitutive element of the furnace and/or based on a specific heat capacity of a constitutive element of the furnace.

Preferably, the furnace comprises one or more control units for controlling one or more heating elements and/or one or more rapid heating elements. Preferably, it is possible to use several masses of several constitutive elements of the furnace. Preferably, it is possible to use several specific heat capacities of several constitutive elements of the furnace.

Preferably, the constitutive elements further comprise one or more rolls for transporting and/or guiding the metal product in the furnace and in that the control unit is capable of controlling the heating unit and/or the rapid heating element based on one or more thermal inertia properties of one or more rolls. Preferably, the furnace comprises one or more control units for controlling one or more heating units, and/or one or more rapid heating elements.

Preferably, the control unit is capable of controlling the heating unit and/or the rapid heating elements based on one or more temperatures of one or more rolls. Alternatively, it is possible to use a mass and/or a specific heat capacity of the rolls. Preferably, the furnace comprises one or more control units for controlling one or more heating units and/or one or more rapid heating elements.

Preferably, the control unit is capable of controlling the heating unit and/or rapid heating element based on a thermal inertial property of a wall. A thermal inertia property of a wall is, for example: a mass of a wall, the temperature of a wall (temperature profile), the specific heat capacity of a wall. Preferably, the furnace comprises one or more control units for controlling one or more heating units and/or one or more rapid heating elements.

Preferably, the walls are furthermore characterized by wall temperatures, wall thicknesses and wall energy capacities, and in that the control unit is capable of controlling the at least one heating unit and the rapid heating element from a heat exchange inertial parameter comprising:
    wall temperatures,
    wall thicknesses, and,
    wall heat capacities.

The walls of the furnace are preferably elements of the furnace representing a large thermal inertia. It seems particularly advantageous to consider their thermal inertia during a change in regime of the furnace, the walls will be greatly responsible for the transition time between two furnace regimes. Thus, in order to determine a thermal inertia property, the control unit receives information relating to wall temperatures by determination means and already has available to it, information relating to the wall thicknesses and to the wall energy capacities. Preferably, the control unit weighs the thermal inertia property of the wall of the furnace according to the distance of the metal product with the wall having a given thermal inertia given in a given time.

Preferably, the wall thicknesses and the wall temperatures being combined in wall temperature profiles according to the thickness of the walls, the thermal inertia property comprising:
    the wall temperature profiles,
    the wall heat capacities.

Preferably, the control unit is capable of controlling the at least one heating unit and/or the rapid heating element based on temperature profiles through (or all along) the walls.

The determination of a thermal inertia property preferably comes from several wall portions. A wall portion could be the arch, the base, the walls or any other structural element of the furnace, for example an internal wall intended to support the arch. The walls or wall portion being constructed of refractory materials having high energy capacities, it is particularly relevant to consider a wall temperature profile over the thickness of the wall or wall portions in order to consider more precisely the heat quantity which is stored there. Indeed, there is a great difference in heat quantity stored in the walls/wall portions for a furnace operating at a predefined temperature being started and a furnace operating at a predefined temperature, but having operated before at a temperature greater than the predefined temperature. Thus, the temperature profile of the walls of the furnace in both situations described differs, although a surface wall temperature inside the furnace can be mainly the same. Thus, the wall/wall portion temperature profile makes it possible to consider the temperature history of the furnace. The temperature profile is, for example, a curve having, as abscissa the wall/wall portion thickness with the internal and external wall surface limits, and having, as ordinate a temperature or a heat quantity. A temperature profile according to the disclosure allows to better consider the heat quantity stored by the wall/wall portion that a simple measurement of the wall temperature on the surface. A wall temperature profile is, for example, modelled from internal and external wall surface temperature information over time, materials composing the wall and the thickness.

Preferably, the wall temperature profiles are determined based on historic (or past) and/or future temperature information. The disclosure allows for predictive control and therefore providing for future developments to apply to the furnace.

As mentioned above, preferably the wall temperature profile is determined based on historic and/or future temperature information in order to consider the diffusion of the heat inside the wall. Such an item of historic temperature information makes it possible to avoid means for determining temperature inside the wall. Indeed, historic information of past temperature makes it possible to model the diffusion of the heat in the wall so as to be absolutely satisfactorily compared with physical determination means (to determine the temperature) positioned inside the wall. Historic information of temperature is, for example, a surface wall temperature combined with time information. For example, such past temperature information occurred between 0 and 15 minutes, preferably between 0 and 5 minutes, preceding the instant for which a wall heat exchange inertial parameter is determined by the control unit and considered by it to control the heating elements of the furnace. Preferably, the item of historic temperature information is an item of information determined by the determination means.

Preferably, the wall temperatures comprise a wall temperature inside the furnace and a wall temperature outside the wall, and in that the wall temperature profiles are determined based on the wall temperatures inside and outside the furnace.

Determining an internal and external surface temperature is particularly advantageous, as it makes it possible to precisely follow the quantity of heat stored by the wall. Like the embodiments stated above, this makes it possible to precisely determine the heat quantity of the metal product which will be absorbed by the wall or the heat quantity of the wall which will be emitted to the metal product.

Preferably, the control unit is furthermore configured to control an moving speed of a metal product in the furnace based on one or more thermal inertia properties or one or more constitutive elements of the furnace.

Preferably, the moving speed of the products is controlled by considering the inertias in place in the furnace, but also time delays due to the movements of products in the furnace.

Preferably, any disruption of the treatment, induces an action on a device to make the temperature vary by induction of a metal product, in order to compensate for the disruption by integrating the inertial effects. For example, a disruption is a change of operating regime which induces a direct and/or corrective action integrating the inertial effects. For example, the loss of a heating zone can be compensated on the fly by a device to make the temperature vary by induction of a metal product.

Preferably, the control unit is furthermore configured to control the at least one heating unit, or the rapid heating element, or the radiant heating tube based on a property of a metal product configured to move in the furnace.

A property of a product is, for example, a physico-chemical property, a type of metal, a type of metal alloy, a steel composition, a dimension such as the product thickness or width, a phase (austenite, ferrite, martensite, bainite, perlite, etc.), a phase mixture, a surface state of the product, a roughness, data relating to a preceding lamination, to a preceding heat or metallurgic or chemical or galvanization treatment, and/or a variation of a property or of a quality all along a product.

Preferably, the control unit is furthermore configured to control the at least one heating unit and/or the rapid heating element based on a temperature of the heating unit, or a temperature of the rapid heating element, or a temperature of the radiant heating tube.

For example, a thermal inertia property of a constitutive element of the furnace is a temperature on the surface and/or intrinsic of an element of the furnace and more specifically of a radiant heating element. For example, the surface temperature of a radiant heating element is measured by one or more thermocouples, and/or calculated at one point or several points, the calculation(s) could refer to at least one thermocouple installed in the furnace and/or on particular equipment. For example, a thermal inertia property or any other indicator makes it possible to define the state of inertia of an element of the furnace with respect to a moving metal product.

Preferably, the heating unit comprises a radiant heating tube. Preferably, the radiant heating tube has a thermal inertia property of a radiant heating tube temperature and of a radiant heating tube energy capacity.

For example, the temperature of a radiant heating tube is measured with a thermocouple. For example, a thermocouple is positioned near the surface of the radiant heating tube or in contact with the surface of the radiant heating tube.

Preferably, the at least one heating element comprising a plurality of radiant heating tubes, the plurality of radiant heating tubes having at least one thermal inertia property of a plurality of radiant heating tubes depending on their temperatures and their energy capacities.

Preferably, the furnace further comprises:
rolls for transporting and/or guiding the metal product in the furnace, the rolls having roll temperatures, the rolls having thermal properties depending on the temperatures of the rolls.

Preferably, the rolls each comprise a central portion in contact with the strip and two edges not in contact with the strip. For example, a roll having a self-centering profile makes it possible to guide the strip during its moving in the furnace. The roll is characterized in terms of thermal method by a center being in contact and/or in the passage zone of the strip, and by edges, the edges not being in a normal situation in contact with the strip. The dimension of a roll edge can be considered as variable according to the width of the strip. The center of the rolls in contact with the strip and more specifically their roll temperature at the center and/or the thermal features of the rolls at the center are preferably considered as forming an integral part of the thermal inertia properties of the thermal exchange process with mainly the product in the furnace. The roll edges and more specifically, their temperature and/or their thermal features are preferably considered as main heat exchange inertial parameters of the furnace. For example, the central portion and/or the edges are thermal inertia parameters intervening in the furnace.

An analogy relating to a roll thermal inertia property with a wall thermal inertia property is possible. The specific physical properties of the rolls are: a roll external temperature, a roll internal temperature, a radial thickness of the roll, a roll width, a roll item of past temperature information, a roll diameter, a roll energy capacity, etc. A roll temperature profile is, for example, considered in determining a roll thermal inertia property. The advantages linked to the consideration of a thermal inertia property is applied mutatis *mutandis* to a roll heat exchange parameter.

A multilayer roll model is, for example, used by the control unit so as to provide a more precise roll thermal inertia property. Such a multilayer roll model makes it possible to define a multitude of layers about the axis of the roll and composing the roll in order to assign an item of temperature information of heat quantity to each layer of the roll. A multilayer roll model makes it possible, for example, to determine a roll temperature radial profile. Such a multilayer roll model can be verified by the use of thermocouple at different radial thickness positions.

Preferably, the at least one heat exchange parameter is a thermal inertia property of heat of at least one of the following constitutive elements of the furnace: the rolls; the walls; the radiant heating tubes.

Preferably, the induction heating element is an effective inducer on non-magnetic metal products, this being positioned downstream from a heating unit having a heat exchange capacity mainly defined by at least one of the following heat transfer modes: convection, conduction, direct or indirect thermal radiation, phase transformation, physico-chemical transformation, preferably the heating element being a radiant heating tube. According to another embodiment, the induction device is an effective inducer on magnetic products.

In the case of rapid device to make the temperature of a metal product vary in the inducer-type furnace operating on products of which the features are non-magnetic, such as for example, beyond the curie point on steels, these can be positioned in the furnace, for example almost at the end of the furnace or at the end of a zone where a quality target must be reached, as they allow to compensate for the thermal inertias closest to the target.

Preferably, the furnace comprises:
- a first portion to vary the temperature of a metal product comprising at least one heating unit or a rapid heating element, and,
- a second portion to maintain the temperature of a metal product comprising at least one heating unit or one rapid heating element, characterized in that the control unit is capable of:
- controlling the heating unit or the rapid heating element of the first portion to make the temperature of a metal product vary, and,
- controlling the heating unit or the rapid heating element of the second portion to make the temperature of a metal product vary, or maintain it.

For example, a portion comprises at least one constitutive element of the furnace which could dynamically change functional state to make the temperature of a metal part vary or maintain it in a second portion of the furnace.

Preferably, the rapid devices to vary the temperature of a metal product allow, during a product target temperature modification and/or product feature and/or operating regime, to reach a product target temperature, i.e. to reach a temperature range comprising the target temperature, more quickly and/or more precisely than with heating elements of the radiant tube type.

Preferably, the rapid devices for varying the temperature of a metal product, allow during a target temperature modification and/or product quality and/or operating regime, a modification of the strip temperature profile in the furnace, better controlled than with devices for making the temperature of a metal product of radiant heating type vary. Preferably, an advantage of this embodiment is to be able to make a heating maintenance zone shift dynamically, or to make it dynamically return into maintenance.

For example, another disadvantage of the state of the art when a following product requires a lesser energy input with respect to the current strip is that this often leads to a partial or total overheating of a second following moving product with respect to a target temperature range while this second product requires an energy input less than a first product preceding it. This is the same when a higher energy input is necessary, this leads to an insufficient heat input. A first product can be a first strip portion and a second product, a second strip portion. Preferably, a first strip portion precedes a second strip portion.

Thus, the state of the art does not allow a good management of transients when a first moving product requires an energy input different from a second moving product which follows the first moving product. For example, a first moving product requires an energy input higher than a second moving product, the disclosure makes it possible to adapt the energy exchange necessary by considering the thermal inertia properties of constitutive elements of the furnace and makes it possible to anticipate a change on a product portion in order to provide a quantity of energy adapted during the change to the following product.

The disclosure allows a better management of these transients by considering the energy interaction of the elements of the furnace having a thermal inertia, a particular case being the temperature of the radiant heating elements. The advantage of considering the temperature, for example of the radiant tubes, such as constitutive element of the furnace having a thermal inertia, is that this makes it possible to predict their energy interaction in the transient phases while ensuring to remain in a target strip temperature range for the first and second products. The management of the product temperature being mainly defined by the energy exchange which is applied to it, to which is added the energy exchanges with the equipment of the furnace. The disclosure thus makes it possible to better integrate the thermal inertia properties of the constitutive elements of the furnace having a thermal inertia and, in particular, of the radiant heating elements, of the walls of the furnace, of the rolls and any constitutive element of the furnace.

The improvement of the transitions presents certain limits for a furnace wherein the instructions to the devices to vary the temperature of a metal product are only defined based on a power to be exchanged with the product and/or one/more zone temperature(s) and/or cooling regimes to achieve this. Furnaces can comprise a combination of quicker device(s) and slower constitutive element(s) of the furnace, for example radiant heating tubes to vary the temperature of a metal part. To extend the transient management range and thus have a greater flexibility between the temperature for treating a first and a second product, the consideration of the thermal inertia properties thus seems useful and advantageous.

The term "heat exchange" or the term "heating" should be interpreted as relating to the variation of a product temperature, relating to a positive temperature variation, but can for example relate to a negative temperature variation or also to a zero temperature variation requiring a balance between the heat received by the product and the heat emitted by the product, which finally gives a maintaining of the temperature of the product.

Preferably, the metal product is a metal part or a metal strip.

Preferably, an action on the guiding of the metal product during its moving in the furnace allows to transform the metal product into a rapid device which could vary the temperature of at least one roll, such that a temperature profile of the at least one roll can be modified.

Preferably, temporary actions on the strip guiding make it possible to transform the strip into a rapid device in order to dynamically modify the profile of the furnace roll(s).

Preferably, the furnace further comprises determination means capable of determining at least one physical parameter to determine one or more thermal inertia properties of one or more constitutive elements of the furnace.

Another aim of the present disclosure is to better consider what appears at dead times of radiant heating elements. Radiant heating elements such as radiant tubes have a dead time, a phenomenon which is not broadly considered. The flame develops inside the tube and any power change starts to produce its effects on the target product after the heat flow has passed through the wall of the radiant element. During a power decrease, the radiant surface of the radiant element loses temperature, but is supplied with energy by the internal mass of the radiant element which is thermally decompressed. Moreover, these apparent dead times are added to the dead times of all of the control chain: interface to the upper systems giving primary information about the products, the cycle time of the control system—whatever the control system, could be a combination of several particular control units and their interaction, the responsiveness of possible intermediate control loops, the communication to the outlets of the control system of the furnace and the responsiveness of the control elements such as the control instruments.

According to a second aspect, the inventors propose a method for controlling the temperature of a metal product in a furnace for a heat treatment of the metal product, the furnace comprising constitutive elements each having a thermal inertia determined from physical parameters, the constitutive elements comprising:
walls delimiting at least partially the furnace;
at least one heating unit for heating a metal product when the latter is at least partially in the furnace;
a rapid heating element for heating a metal product when the latter is at least partially in the furnace, the rapid heating element being distinct from the heating unit;

the furnace further comprising:
a control unit for controlling the at least one heating unit and/or the rapid heating element;

the method comprising the following steps:
a) determining one or more thermal inertia properties of one or more constitutive elements of the furnace, a thermal inertia property of a constitutive element of the furnace being at least one mass of a constitutive element of the furnace;
b) providing to the control unit the one or more thermal inertia properties of one or more constitutive elements of the furnace, of which a thermal inertia property of a constitutive element of the furnace being at least one mass of a constitutive element of the furnace, determined in the preceding step;
c) controlling with the control unit, the at least one heating unit and/or the rapid heating element based on one or more thermal inertia properties of one or more constitutive elements of the furnace, and at least based on a mass of a constitutive element of the furnace determined in step a) and provided in step b).

The advantages and different embodiments of the furnace according to the first aspect are applied to the method according to the second aspect of the disclosure, mutatis mutandis.

Method according to the preceding claim, characterized in that the rapid heating element of the furnace is an induction heating element to vary the temperature by induction of a metal product.

Preferably:
the control unit is capable of controlling the heating unit and/or the rapid heating element based on a temperature of a constitutive element of the furnace and/or based on a specific heat capacity of a constitutive element of the furnace, and in that,
step a) further comprises the determination of a temperature of a constitutive element of the furnace and/or a specific heat capacity of a constitutive element of the furnace,
step b) further comprises providing a temperature of a constitutive element of the furnace and/or a specific heat capacity of a constitutive element of the furnace,
step c) further comprises controlling the heating unit and/or the rapid heating element based on a temperature of a constitutive element of the furnace and/or based on a specific heat capacity of a constitutive element of the furnace.

Preferably, the furnace further comprises:
rolls for transporting and/or guiding the metal product in the furnace, and in that:
step a) further comprises determining one or more thermal inertia properties of one or more rolls;
step b) further comprises providing to the control unit, one or more thermal inertia properties of one or more rolls;
step c) further comprises controlling based on one or more thermal inertia properties of one or more rolls.

Preferably:
step a) further comprises determining one or more temperatures of one or more rolls;
step b) further comprises providing to the control unit, one or more temperatures of one or more rolls;
step c) further comprises controlling based on one or more temperatures of one or more rolls.

Preferably:
step a) further comprises determining a thermal inertia property of a wall;
step b) further comprises providing to the control unit, a thermal inertia property of a wall;
step c) further comprises controlling based on a thermal inertia property of a wall.

Preferably, the rapid heating element is an induction heating element to vary the temperature by induction of a metal product.

Preferably,
the walls of the furnace are furthermore characterised by wall temperatures, wall thicknesses and wall energy capacities, in that:
step a) further comprises determining:
wall temperatures,
wall thicknesses, and,
wall energy capacities;
step b) further comprises providing:
wall temperatures,
wall thicknesses, and,
wall heat capacities;
the controlling step c) further comprises controlling the heating unit and/or the rapid heating element, based on:
wall temperatures,
wall thicknesses, and,
wall heat capacities.

Preferably:
step a) further comprises determining the wall temperature profiles according to the thickness of the walls by combining the wall thicknesses and the wall temperatures,
step b) further comprises providing wall temperature profiles according to the thickness of the walls;
step c) further comprises controlling based on wall temperature profiles.

Preferably, the determination in step a) of the wall temperature profiles is furthermore determined based on historic and/or future temperature information.

Preferably, the determination of a wall temperature of step a) comprises a wall temperature measurement inside the furnace and a wall temperature measurement outside the furnace, in that the inside and outside temperature measurements are provided to the control unit, and in that the control of step c) is carried out based on inside and outside wall temperature measurements.

Preferably, the control unit is furthermore configured to control a moving speed of a metal product in the furnace, step c) furthermore making it possible to control the moving speed of a metal product in the furnace based on one or more thermal inertia properties of one or more constitutive elements of the furnace.

Preferably, the at least one heating unit comprises a radiant heating tube, and in that control step c) furthermore allows to control the radiant heating tube.

Preferably:
step a) further comprises determining at least one radiant heating tube temperature;

step b) further comprises providing at least one radiant heating tube temperature;

step c) further comprises controlling based on at least one radiant heating tube temperature.

Preferably, the control of step c) by the control unit of the at least one heating unit, of the rapid heating element, and of the radiant heating tube depends on a property of a metal product configured to move in the furnace.

Preferably:

step a) further comprises measuring at least one temperature of a heating unit, and/or a temperature of the rapid heating element, and/or a temperature of the radiant heating tube;

step b) further comprises providing measurements of step a);

step c) further comprises controlling based on at least one temperature of a heating unit, and/or a temperature of the rapid heating element, and/or a temperature of the radiant heating tube.

Preferably:

a first portion to vary the temperature of a metal product comprising at least one heating unit or a rapid heating element, and, a second portion to maintain the temperature of a metal product comprising at least one heating unit or one rapid heating element, control step c) comprising the following sub-steps:

controlling the heating unit or the rapid heating element of the first portion based on at least one thermal inertia property to vary the temperature of a moving metal product in the first portion, and, controlling the heating unit or the rapid heating element of the second portion based on at least one thermal inertia property to maintain the temperature of a moving metal product in the second portion.

Preferably, the method further comprises the following step:

d) modifying the guiding of the metal product during its moving in the furnace in order to make it possible to transform the metal product into a rapid heating element which could vary the temperature of at least one roll such that a temperature profile of at least one roll can be modified.

Preferably, the furnace further comprises determination means capable of determining at least one physical parameter to determine one or more thermal inertia properties of one or more constitutive elements of the furnace, and in that the determination means are used during step a) for determining at least one physical parameter to determine one or more thermal inertia properties of one or more constitutive elements of the furnace.

Preferably, the first and second aspects of the disclosure provide that the determination means are capable of determining heat exchange parameters of the walls, heat exchange parameters of the rolls, heat exchange parameters of the radiant heating tubes and in that the control unit is capable of controlling the heating unit and the rapid heating element based on at least one of the heat exchange parameters: heat exchange parameters of the walls, heat exchange parameters of the rolls, heat exchange parameters of the radiant heating tubes.

According to another aspect, the thermal inertia properties according to the first aspect are heat exchange parameters or heat exchange inertial parameters, for example a temperature, an energy capacity, a thickness, a material volume, a radiation coefficient. According to another aspect, the heat exchange inertial parameters according to the second aspect are heat exchange parameters, for example a temperature, an energy capacity, a thickness, a material volume, a radiation coefficient.

Heating/Annealing Furnaces

A continuous furnace is an item of equipment which makes it possible to heat a product which continuously uncoils therein, in order to reach a necessary temperature or target temperature to result in the target metallurgic and/or mechanical properties. The furnace then makes it possible to continuously cool the product, optionally by respecting an imposed profile. According to the type of method, several types of furnaces according to the disclosure are industrially implemented:

for example, in a radiant tube vertical furnace which is fully equipped with radiant tubes, in a nitrogen/hydrogen protective atmosphere making it possible to guarantee a protective atmosphere inside the furnace; the product (or the strip) increases in temperature all throughout its path in the furnace; the furnace is equipped with deflective rolls in direct contact with the product at each vertical pass, the deflective rolls being mainly positioned between the vertical passes. Cooling zones follow the heating portion;

for example, in a direct flame furnace: the product is introduced counter-current from the combustion gases (preheating) and passes through the direct combustion heating zones. The walls, the arch and the base are often composed of fire bricks, heightening the thermal inertia of the equipment. The cooling zones follow the heating portion;

for example, in a hybrid furnace with a direct flame section and a protective atmosphere section and radiant tubes. Cooling zones follow the heating portion;

for example, in an electric heating furnace. Cooling zones follow the heating portion;

for example, in a furnace integrating an induction heating section possibly combined with other heating types. Cooling zones follow the heating portion.

The heating and maintenance sections are often followed by cooling zones calling upon one or more techniques sometimes combined with cooling. For example, by radiation, by natural convection, by forced convection, by fluid mist such as water, by fluid jet such as water, by direct contact with fluids such as water, by conduction with rolls cooled by physico-chemical transformation.

Constraints of the Furnace Equipment

During the heating of the strip in a furnace not comprising any rapid device to vary the temperature of a metal product, the thermal exchanges typically by radiation between the product and the burners—directly or through radiant elements—are of first order. A heating by forced convection of a hot gas is also possible. During the cooling, the heat exchanges by forced convection—impact of a cooled gas on the strip—are a typical engine of the thermal exchanges. In the direct cooling with water, the conduction is generally the combustion engine. The equipment of a furnace however provides its constraints, which form part of the elements to be controlled: the thermal capacities installed, the maximum mechanical-thermal temperature for the operating of the equipment and sub-equipment, etc.

The different furnaces or even the different equipment and sub-equipment such as the burners or the radiant tubes call upon various variants in the measuring instruments: thermocouple, regulation thermocouple, etc. which can be mounted physically in places depending on engineering preferences. Regarding the measuring of the temperature of the final product, it is done generally by pyrometry. Several mounting techniques form part of the state of the art. The viewing of the behavior of the furnace through these variants of instruments form part of the work of controlling furnaces in order to reach the qualities aimed for. Another aspect of the present disclosure is to include self-learning methods which estimate in line with the values of parameters which are intrinsic to the furnace.

The strip transport through the furnace is a crucial point, particularly for vertical furnaces which call upon deflective rolls. Indeed, these induce an additional component of heat exchange and furthermore have a profile which allows the centering of the product on its moving axis during its transport over the production line and more specifically, in the furnace. The rolls are deformed according to the temperature, the self-centering can be disrupted and have major consequences for production. A modification of the profile of the rolls can lead to a "simple" deterioration of the material by heat buckle, or to a simple stopping of the line following a meandering, but also to a strip breaking with collateral damage inducing several hours and even sometimes several days of production downtime.

Preferably, temporary actions on a rapid device to vary the temperature of a metal product make it possible to secure as quickly as possible the operating points of the equipment linked to strip folding and/or meandering risks.

Management of Transients

Another disadvantage of the state of the art that the present disclosure proposes to resolve, relates to determining instructions to the constitutive devices of the furnace to vary the temperature of a product. Determining instructions of a furnace in stationary state, i.e. having stable operating points, does not suffice, as users of furnaces for treating products find through their order books, a high variability of several parameters:

change of product type, typically of alloy type,
change of product dimension: width, thickness,
change of cycle, i.e. change of the aimed for product(s) temperature(s) and optionally of the temperature profile to be respected,
quality limit aims on the cycle, sometimes close,
change of target production speed.

For each product, a set of specific instructions is determined, which involves recurrent changes of the operating points product-by-product and therefore of the strip temperature profile all along the furnace. These situations of recurrent changes are part of the day for many producers. Threading transitions sometimes result in unrealistic situations leading to a portion of the product being outside the target temperature ranges (quality limits) imposed.

Preferably, a thermal inertia property is defined by the effect of strip length in a furnace with a strip development, which can lead to geographical delays, these delays together with the inertias of the furnace are more or less important, in particular according to the moving speed, to the thickness, to the width and/or to the energy capacity of the product.

Preferably, a thermal inertia property is a geographical delay due to the transport of product in the furnace. A geographical delay in the furnace is due to the fact that any action on the furnace, can be applied to several or all of the present product segments. Each segment can be inflicted with new conditions for a duration, depending on its position in the furnace. Consequently, during production, each segment exiting the furnace will show a result, for example a strip temperature, changing with delay, then generally continually changing up to the new operating point is reached. The action on the furnace will be presented as a delay and/or a thermal inertia, but of which the origin is geographical and linked to the transport of product. This thermal inertia combined with the thermal process is presented as non-linear and complex.

A furnace equipped with slow devices to vary the temperature of a product and rapid devices to vary the temperature of a product according to the disclosure allows, during a modification of the strip moving speed, to induce by way of the control unit, a modification of the furnace instruction on a rapid device to vary the temperature of a product, in order to compensate, as quickly as possible, for the disruption induced by the moving speed change. For example, a rapid device to vary the temperature of a product makes it possible to compensate, very quickly, for the disruption induced by the moving speed change. The control unit is subsequently configured to transfer charges from a rapid heating element to another (slow) heating element, for example radiant tubes, by considering, during the transfer of the heating instruction, thermal inertia properties relating, in particular, to the radiant tubes, the rolls or the walls of the furnace and any other intrinsic thermal inertia property of a constitutive element of the furnace.

A disruption and/or a difference on the strip features or product properties known in advance or detected in line, for example the variation of the quality of the steel, is compensated for by the furnace, according to the disclosure by inducing an action on a rapid device to vary the temperature of a product, in compensation for the product variation. For example, a strip property known in advance or detected in line (for example, but in a limiting manner upstream from the furnace) consequently having, the needs for a lesser heat quantity for one same quality aim is compensated for by an instruction to a rapid device to vary the temperature of a product, in order to compensate for such a variation, as early as possible. For example, and in an imaged manner, a "camel back" of feature(s) of a product, i.e. a variation of feature(s) developing all along a product to come back to the product end at a level equivalent to that of the start of the product and forming a boss, is compensated for by an instruction considering the thermal inertia properties of the furnace so as to apply a heat treatment correction with reverse effect to the "camel back". Other profiles of features can be presented as an S-shaped profile seen horizontally or a profile continued in a direction. This continued profile will demand a particularly rapid change of instruction at the product end and/or at the following product start.

Any disruption and/or difference on the product features or product property known or detected in line and requiring a modification of a target strip temperature and/or an operating point of the furnace, can induce according to the disclosure, an action on a rapid device to vary the temperature of a product, in compensation for a slow variation of a slow device to vary the temperature of a product, of which a new operating point will have been determined. Thus, the control unit defines new furnace instructions which vary over time by considering, in particular the thermal inertia properties of the constitutive elements of the furnace having a thermal inertia. Thus, the rapid device to vary the temperature of a product, thanks to the instruction sent by the control unit makes it possible to ensure the transition up to the new operating point defined by the modification of property of the product detected being reached mainly thanks to the radiant heating tubes. Preferably, the new operating point is mainly reached by the devices to vary the temperature of a constitutive product of the furnace, including the slow device to vary the temperature of a product, for example a heating element or slow device to vary the temperature of a product, calling upon radiant heating tubes.

During a modification of a parameter of a product requiring a different operating point then in place in the furnace, the consideration of the thermal inertia properties by the control unit allows, initially, the sending of an instruction to a rapid device to vary the temperature of a product, in order to reach, as quickly as possible, the target quality aims (for example, defined by a target strip temperature). Secondly, or simultaneously, the control unit determines a new instruction from the slow device to vary the temperature of a product, in order to reach an operating point of the furnace allowing the target strip temperature to be reached. The consideration of the thermal inertia properties is then essential to reach, as quickly as possible, the new target strip temperature by bringing the furnace to a new operating point. This is particularly advantageous for better management of the transients. Better management of the transients is obtained when the time spent for passing from a first operating point to a second operating point aiming, for example, for a change of target strip temperature of a second product, executed on a portion of a product or of the other product of shared between the two products is reduced with respect to conventional management of the transients not considering the thermal inertia properties. The combination of the consideration of the thermal inertia properties and of a rapid device to vary the temperature of a product, is particularly advantageous with the aim of obtaining better management of the transients.

In the furnace according to the embodiments stated above, temporary actions on a rapid device to vary the temperature of a product aim for compensating for the slow reactions of a slow device during the transients. The correct compensation for the slow reactions of a slow device to vary the temperature of a product by a rapid device is in particular possible thanks to the consideration of the thermal inertia properties by the control unit. The consideration of the thermal inertia properties is particularly advantageous with respect to a simple modelling of the exchange of the heat source to the product considering the thermal inertia properties of the constitutive elements of the furnace having a large thermal inertia is difficult to model. For example, the treatment history corresponding mainly to the heating parameters of the elements of the furnace having a thermal inertia is very difficult to apprehend during such a simple modelling.

In the furnace according to the embodiments stated above, the rapid device to vary the temperature of a product aims to minimize the times and/or product lengths covering the transients for which the target strip temperature is not reached or for which it is not possible to guarantee its good quality. This minimization is preferably obtained by the sending of a new instruction to a slow device to vary the temperature of a product in combination with a temporary instruction or more extended and possibly adapted over time to the rapid device to vary the temperature of a product.

In the furnace according to the embodiments stated above, the fact that the temporary actions (instructions) on the rapid device to vary the temperature of a product aim to quickly modify the operating points of the installation, makes it possible to quickly prepare the furnace with a new operating regime, chosen on the fly, i.e. without particular planning beforehand. This is particularly advantageous during the change of an energy operating point, or the change of product planning over relatively short times.

In the furnace according to the embodiments stated above, temporary actions on the rapid device to vary the temperature of a product aim to secure, as quickly as possible, the operating points of the equipment linked to strip folding and/or meandering risks. Thus, a temporary instruction to the rapid device to vary the temperature of a product makes it possible to limit the risks linked to the strip folds and/or meandering during changes. An instruction to a rapid device to vary the temperature of a product can, when there is a significant risk of strip folding or meandering during a transient, during a change in the production or the production line, or simply during normal use due to a modification of the product parameters or properties, allowing for better strip centering on its transport axis and/or avoiding strip folds.

In the furnace according to the embodiments stated above, temporary actions on the rapid device to vary the temperature of a product aim to transitorily manage the operating points of the equipment, in order to limit the strip folds and/or meandering risks, the time that the slow device to vary the temperature of a product is established on its regime.

In the furnace according to the embodiments stated above, temporary actions on the guiding of the product can transform the product in the furnace element equivalent to a rapid device to make the roll temperature vary and make it possible to dynamically modify the profile of the furnace roll(s). Indeed, it can be useful to dynamically modify the profile of one (or more) roll(s) towards a transient. The meandering on a roll, i.e. the action of deviating the strip of the central portion to the roll edges makes it possible to modify its profile. For example, the roll edges are often heated hotter than the central roll portion, although there are deflectors to limit its overheating, and by cooling, the edges of the rolls are often cooler. This phenomenon is common and does not prevent the correct guiding of the strip, but can prove to be impeding during a transient. Thus, the action of making the strip pass over the roll edges often makes it possible to change its temperature while remaining in strip temperatures ensuring the good quality of the heat treatment.

In the furnace according to the embodiments stated above, it is advantageous to modify a roll profile, for example heated, equipped with a rapid device to vary the temperature of a product positioned upstream in a zone with no or hardly any rolls, the rolls themselves positioned in a slow furnace zone, i.e. equipped with slow devices to vary the temperature of a product for sending a lesser heating instruction to the slow devices and for sending a higher heating instruction to the rapid device. For example, in the case of an induction rapid device, this only heats the strip and does not therefore heat the edges of rolls, as this would make it a slow device.

The disclosure advantageously allows for better management of the furnace and in particular, the management of transients with the aim of preventing the risks of meandering and of forming strip folds. The consideration of the thermal inertia properties of the furnace allows these risks to be prevented, in particular, by modifying, in good time, the furnace instructions while avoiding reaching dangerous operating points. A control not considering these thermal inertia properties of the furnace would not allow for such effectiveness in preventing these risks by limiting the probability of quickly reaching dangerous operating points.

According to another aspect, the disclosure relates to a management of transient on increasing the strip width. A management technique, allows, predictively and dynamically, to guide the strip outside of the moving axis, on one side, then on the other. The aim being to cool the rolls laterally and to minimize the risks in case of variation of width.

DESCRIPTION OF THE DRAWINGS

These aspects, as well as other aspects of the disclosure will be clarified in the detailed description of particular embodiments of the disclosure, with reference being made to the drawings of the figures, wherein.

The drawings of the figures are not to scale. Generally, similar elements are denoted by similar references in the figures. The presence of reference numbers in the drawings cannot be considered as limiting, including when these numbers are indicated in the claims.

DETAILED DESCRIPTION

Figure 1:
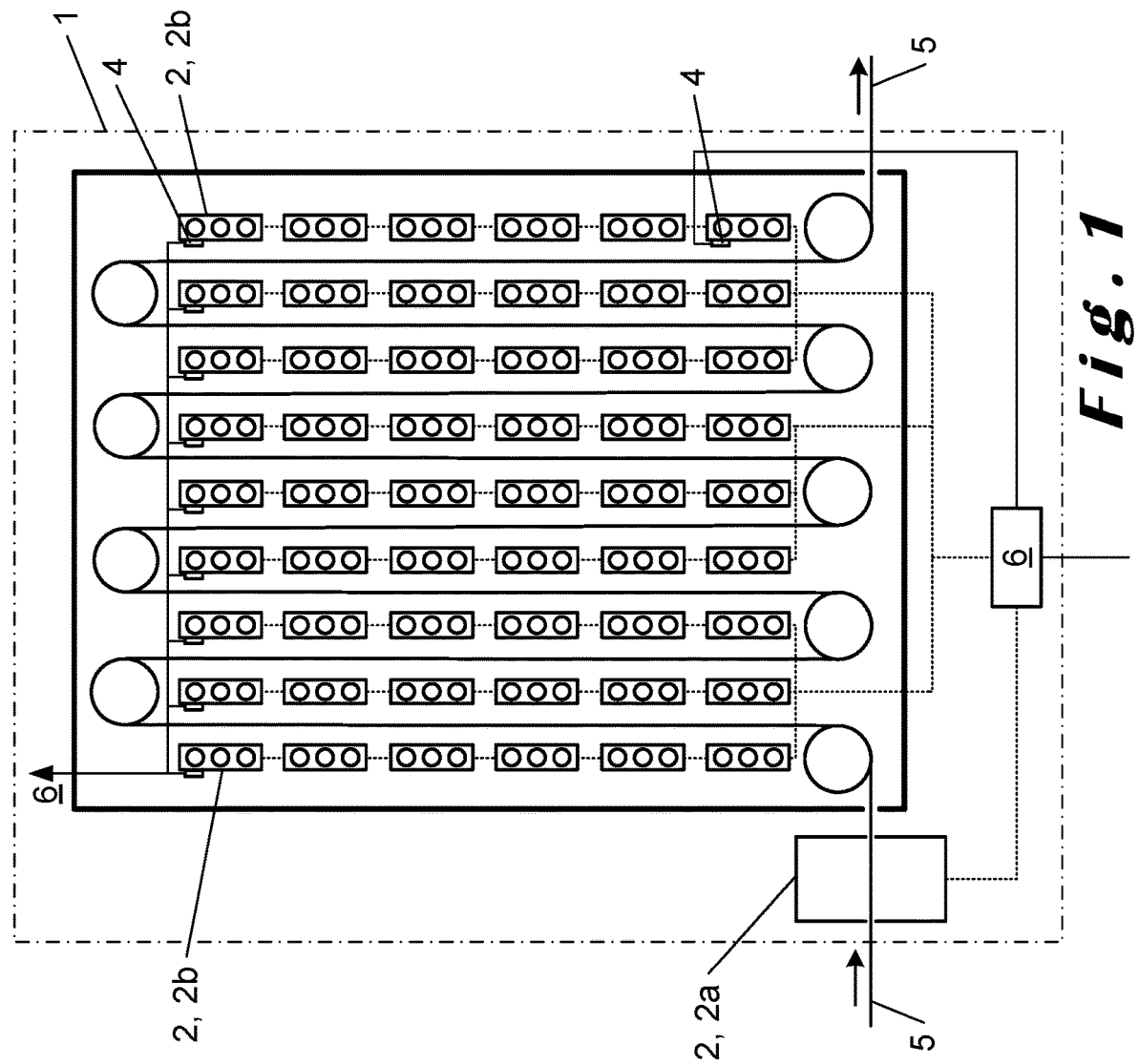
FIG. 1 shows a particular, schematic embodiment of the furnace according to the disclosure.

FIG. 1 shows a furnace 1 for the heat treatment embodiment of a product in the form of a strip 5. The furnace 1 comprises a rapid 2a heating element 2. The rapid 2a heating element 2 is preferably an induction heating element 2 wherein the product 5 can pass in order to be relatively quickly increased in temperature. The furnace 1 also comprises a slow 2b heating element 2, a radiant tube heating system in the embodiment presented. The radiant tube heating elements 2 are considered as slow with respect to an induction heating element 2, as the radiant tube heating is relatively slow to react during a change of heating power sought, given the thermal inertias in play, on the contrary from the rapid 2a heating element 2, which allows for a modification considered as instantaneous, of the heating power supplied to the moving product.

A device to vary the temperature of a slow 2b product 2, for example by radiant tubes, as presented in the embodiment of FIG. 1 comprises a plurality of radiant tubes 2b arranged along the path of the product 5 in the furnace 1. In the embodiment presented, these radiant tubes 2b are, for some of them or for all of them in a case not illustrated, equipped with at least one temperature sensor 4. The temperatures of the radiant tubes can be on the surface and/or in the mass of a tube and/or in the flame flow and/or in the flow of the combustion product. In the same way as for other elements of the furnace 1, the temperatures can be surface temperatures and/or temperatures in the material, at a certain depth. An extreme case is the case where the temperature of one or more of the tubes is not measured, but provides a virtual and therefore calculated sensor. Preferably, a physical temperature sensor 4 for radiant tubes is a thermocouple allowing a measurement in a temperature range corresponding to the temperature of the radiant tube in operation or stopped. The furnaces 1 or their sub-equipment often being equipped with a control system and/or secured, allowing to not exceed a temperature beyond which the equipment, such as the radiant tubes undergo an accelerated deterioration or a temperature beyond which an accelerated creeping of the materials is put in place, thus requiring premature replacements of equipment.

In an embodiment of the invention, the physical or virtual sensors 4 of the radiant tubes are connected to a control unit 6 (i.e., a control circuit). For example, all radiant tubes are equipped with sensors 4 allowing the control unit to determine a temperature of the radiant tubes. For example, some of the radiant tubes are equipped with sensors 4, the other portion of the radiant tubes are not equipped with sensors 4, but the information is sufficient to allow the control unit to determine the temperature of all the radiant tubes by calculation.

The devices 2 to make the temperature of a metal product 5 vary in the furnace 1 are connected to the control unit 6. The control unit 6 makes it possible to control the heat transfer of the devices 2 to make the temperature of a metal product 5 vary, and of its heating time management. The control unit 6 makes it possible to manage the control (heating instructions) by considering one or more temperatures of constitutive elements of the furnace 1 having a large thermal inertia. This makes it possible to have a furnace 1 with a better overall management of the heating parameters or instructions.

Examples of thermal inertia property used to control are, for example: a mass of a roll 7, a mass of several rolls 7, a mass of a wall 8, a mass of several walls 8, a mass of a radiant heating tube 2b, a mass of several radiant heating tubes 2b.

In a preferred embodiment of the disclosure, the rapid 2a and slow 2b devices to make the temperature vary are controlled by the symbiotic control unit 6. For example, the rapid 2a device 2 is used to preheat the product 5 before being heated by the slow 2b device 2 (radiant heating tubes).

The present disclosure allows a distribution of the charges (heating instructions) between the rapid 2a device 2 and the slow 2b device 2 to minimize problems in production on the products 5, such as strip folds or meandering.

FIG. 1 shows a rapid 2a heating element 2 situated upstream from several devices to make the temperature of a slow 2b metal product 2 vary or radiant heating tube 2b. A device to make the temperature of a metal product 5 vary can also define several devices 2 to make the temperature of a metal product 5 vary. For example, a device 2 can be constituted of several devices 2 placed along the path of the strip 5 in the furnace 1. Generally, a furnace 1 is divided into sections, of which one or more heating sections, each section able to be divided into zones, the zones are able to group radiant tubes 2b. An extreme case of the cut-out is that each radiant tube 2b is a zone. The notion of upstream is in particular indicated by the moving direction of the product 5. The radiant heating tubes 2b are positioned downstream from an induction heating device 2a in the embodiment presented.

Figure 2:
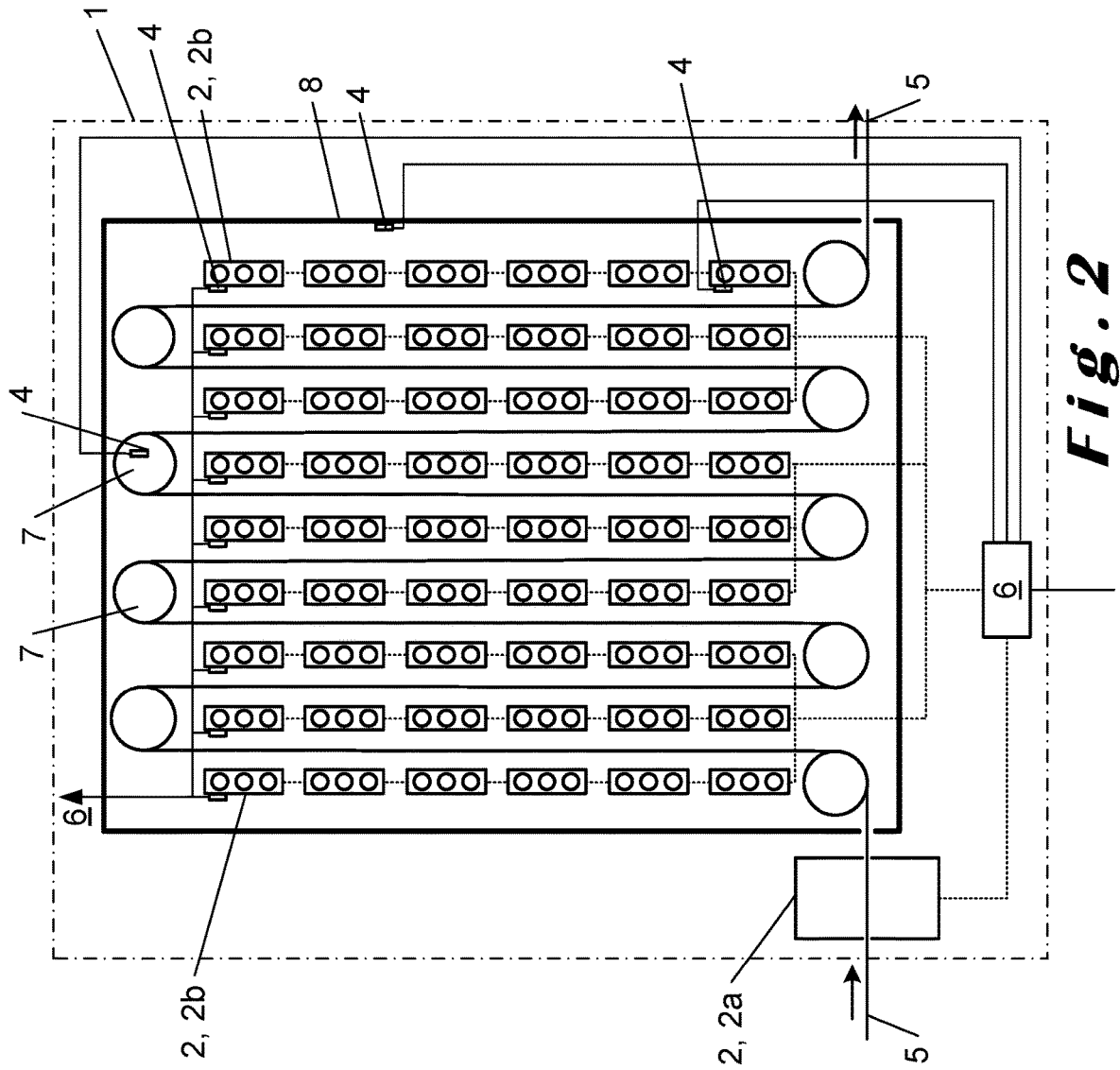
FIG. 2 shows a particular, schematic embodiment of the furnace according to the disclosure.

FIG. 2 shows a furnace 1 comprising temperature sensors 4 allowing to determine wall 8 temperatures and roll 7 temperatures. These temperature sensors 4 are connected to the control unit 6. Temperature values can also be determined by calculating or by modelling in the control unit 6. The temperature values are considered with the thermal features (the energy capacity) of the rolls 7 and/or walls 8 makes it possible to determine at least one thermal inertia property. According to the thermal inertia properties relating to the slow 2b devices 2, in particular radiant heating tubes 2b, relating to the walls 8 and relating to the rolls 7, the control unit 6 sends an instruction to rapid 2a heating devices 2 and/or to the slow 2b heating devices 2. This allows a good consideration of the thermal inertia properties, in particular during modifications of operating points and, in particular, during transients, during identification of risk of meandering or strip folds 5.

Figure 3:
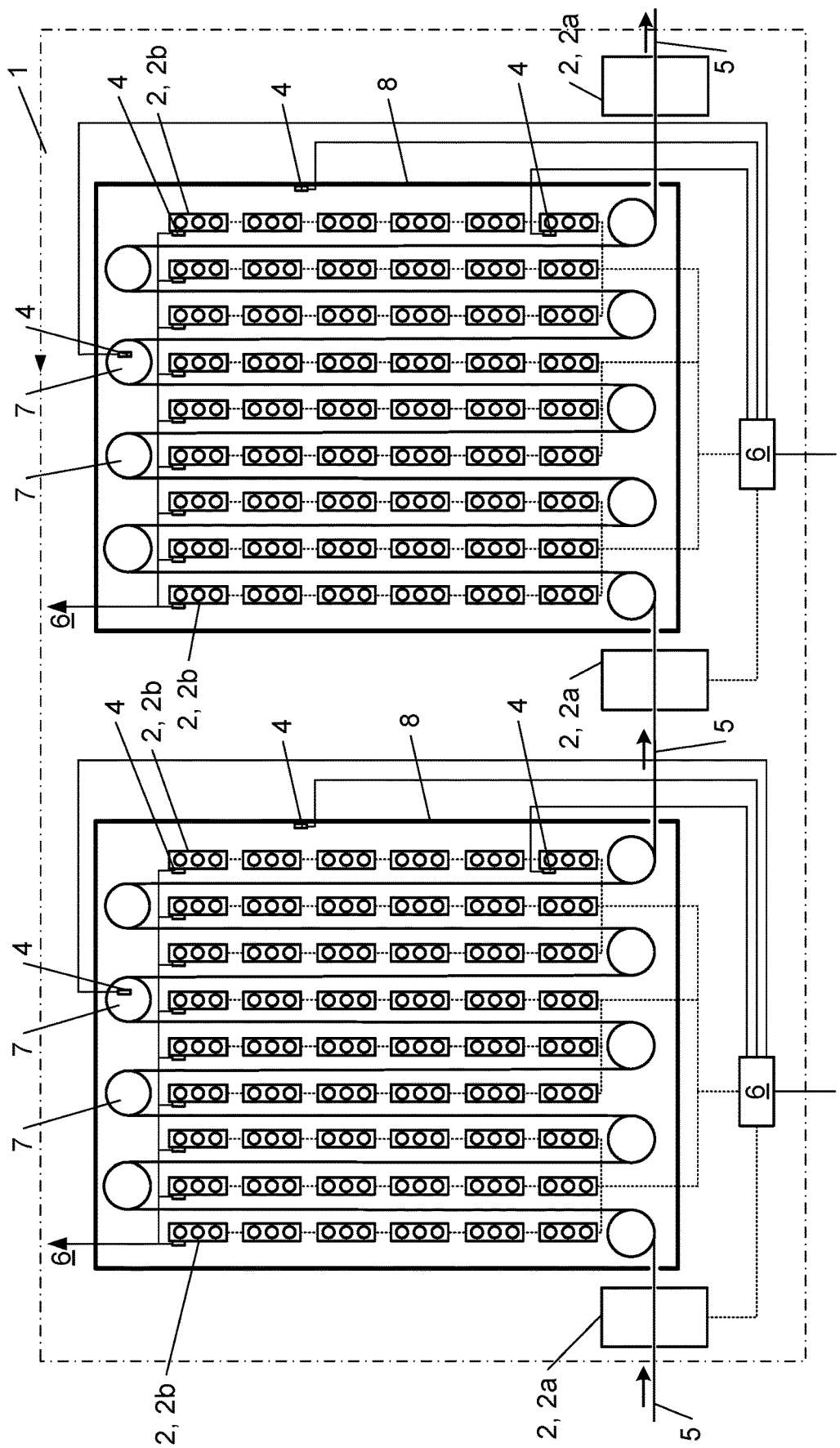
FIG. 3 shows a particular, schematic embodiment of the furnace according to the disclosure.

FIG. 3 shows a furnace 1 comprising twice the furnace 1 shown in FIG. 2 put, in terms of product crossing through the equipment, end-to-end and with a rapid 2a heating device 2 positioned upstream from each furnace, or downstream from it. This configuration shows that the position of the rapid 2a devices 2 to make the temperature of a metal product 5 vary can be modified with respect to the conventional/slow 2b devices 2. According to the aim sought, a rapid 2a device 2 is positioned upstream from a series of slow 2b devices 2, or interleaved or also downstream from it. The number of rapid 2a and/or slow 2b devices 2, as well as their position should not be limited to what is represented in FIG. 3. The furnace 1 can be divided into several zones, each zone can be controlled by a different control unit 6, or by one same control unit 6. The thermal inertia properties can be determined and considered by furnace zone 1 or considered in the overall management of the furnace 1.

Folds

"Folds" or "Heating Folds" and "Heat Buckling" define the strip folds which could be observed during the moving of a strip in a furnace 1. The transport rolls 7/deflectors are not generally flat, but have a profile, of which the main aim is to ensure the self-centering of the metal product 5. Typically, in a vertical furnace with multiple passes, the profile of each roll 7 is determined according to the strip temperature profile in the furnace 1. A roll 7 profile is designed to create self-centering forces and therefore stresses, which are transformed into internal stresses in the strip 5. These forces depend mainly on roll 7 profiles, of the tension applied on the strip 5 during its transport and strip width.

If the stresses created in the strip 5 are greater than the maximum stress which can be supported by the strip 5, critical stress, there is a risk of plastic deformation of the strip 5 and of ultimately deteriorating the product 5. This deformation of the strip 5 corresponds to the strip folds mentioned above. Sometimes, the folds are limited to light folds, called fold primers. The operation of the line can go up to a stop in production in order to be put back into an acceptable regime, or in the worst case, a fastening of the strips creased with the equipment in place in the furnace 1, leading to a tearing and a breaking of the strip with collateral damage. In the latter case, it results in a stopping of production from several hours to several days.

The strip temperature profile develops in the furnace 1. The mechanical resistance property of the strips decreases with the temperature. During the design of a furnace 1, the profile of the rolls 7 is adapted all along the furnace 1, to assist with the guiding, while extending from the critical conditions of risks of folds. More specifically, certain regimes must be avoided, which lead to a rapid increase of strip temperature on rolls 7 with a strong profile.

In a furnace 1, with equipment determined as rolls 7 and their profile, the controllable factors such as strip tension and/or strip temperature profile along the furnace can be adjusted. For example, in a deflector roll 7, the first heating rolls 7 have more marked profiles and cause more internal stresses in the strip 5. On strips with risk of folds, there is a clear advantage in such conditions to minimize energy at the start of the heating process, by distributing the power by a decrease of the power input made at the start of the furnace 1, by a distribution between different devices 2, 2a, 2b to make the temperature of a metal product 5 vary in the furnace 1.

During changes of products (transient), the operating regime of the installation is adapted. There is an interest in changing, as quickly as possible, the operating point of the installation, to keep operating regimes as constant as possible along the coils. For example, this can be done by quickly/immediately changing the operating point of the rapid 2a device 2 (inducer) to vary the temperature of a metal product 5, more specifically before the transition point, in order to keep each product outside of the fold formation regime.

During the change in the strip moving speed, more specifically during the rapid decrease of speed, the operating point of the conventional furnace/forming part of the state of the art, is such that the product treated can be found in a fold formation regime. There is advantageously interest in quickly changing the operating regime of the rapid 2a device 2 (inducer), to let a cool(er) strip 5 enter into the furnace 1, and avoid a warming of the strip, which could be fatal beyond critical values.

In case of change of production regime, there is an interest in preparing the furnace 1 to an operating point adapted to the less critical point of two coils, and/or extending transitorily, i.e. during the transient phase of dangerous operating points.

Strip Guiding

Guiding is referred to, to designate the strip 5 centering in the axis of the line. The jargon uses "meandering" to designate the instabilities in the strip 5 centering, which are, in the first approach, limited by a decrease of the production speed and causes a loss of productivity. But the strip deviation can be such that the strip 5 touches the walls 8 or other equipment and damages the furnace 1, causing material damage and/or a stop in production.

The profile of the rolls 7 of a furnace 1 is a compromise between the risks of folding and self-centering of the strip 5. Weak profiles of rolls 7 will be beneficial for minimizing the risks of folds, but decrease the centering forces. In the case of lines covering the production of products of varied dimension and quality, the compromise between the risks of folds and strip 5 guiding is sought.

In case of risk of strip 5 guiding, there is an interest in heating the strip 5 as early as possible in a furnace, this thus having better adherence on the rolls 7 and therefore better centering. The utilization of the rapid 2a device 2, in particular of an inducer will be beneficial.

In case of a change in the production regime, there is an interest in preparing the furnace 1 to an operating point which is acceptable at the critical standpoint of two metal products 5, and/or in transitorily extending/during the transient phase of dangerous operating points. The rapid 2a device 2, in particular an inducer, will be used to distribute the operating regimes of the different sections, in order to minimize the risks of meandering. This is particularly true in case of an increase in the strip width, or on narrow strips. The technique of the management linked to the problem of risks of strip folds is transposable to the management of the meandering, mutatis *mutandis*.

The present disclosure has been described in relation to specific embodiments, which have a purely illustrative value and must not be considered as limiting. Generally, the present disclosure is not limited to the examples illustrated and/or described above. The use of the verbs "comprise" or "include", or any other variant, as well as their conjugations, cannot in any way exclude the presence of elements other than those mentioned. The use of the indefinite article "a", "an", or of the definite article "the", to introduce an element does not exclude the presence of a plurality of these elements. The reference numbers in the claims do not limit their scope.

In summary, the disclosure can also be described as follows.

The furnace 1 for the heat treatment of a metal product 5 by moving and comprising constitutive elements each having a thermal inertia property determined from physical parameters, the constitutive elements comprising:

walls 8 delimiting at least partially the furnace 1;

a heating unit 2 for heating a metal product 5;

a rapid heating element 2a for heating a metal product 5, the rapid heating element 2a being distinct from the heating unit 2;

the furnace 1 further comprising:

a control unit 6 for controlling the heating unit 2 and/or the rapid heating element 2a based on one or more thermal inertia properties of one or more constitutive elements of the furnace 1, and at least based on a mass of a constitutive element of the furnace 1.

The invention claimed is:

1. A furnace for the thermal treatment of a metal product, comprising:
constitutive elements comprising:
walls delimiting at least partially the furnace;
rolls configured for allowing a movement of the metal product along a determined path;
a heating unit configured for heating the metal product when the metal product is at least partially in the furnace; and
a rapid heating element configured for heating the metal product when the metal product is at least partially in the furnace, the rapid heating element being distinct from the heating unit;
one or more temperature sensors arranged to measure a temperature of at least one of the constitutive elements; and
a control circuit coupled to the heating unit and the rapid heating element,
wherein, based on a temperature and a mass of one or more of said constitutive elements of the furnace, the control circuit is configured to:
send instructions to at least one of the heating unit or the rapid heating element for controlling heat output thereof; and
control a rate of the movement of the metal product along said determined path.

2. The furnace according to claim 1, wherein control of at least one of the heating unit or the rapid heating element by the control circuit is also based on a specific heat capacity of one of the constitutive elements.

3. The furnace according to claim 1, wherein the control circuit is configured to control at least one of the heating unit or the rapid heating element based on the temperature and the mass of one or more of said rolls.

4. The furnace according to claim 1, wherein the control circuit is configured to control at least one of the heating unit or the rapid heating element based on the temperature and the mass of at least one of the walls.

5. The furnace according to claim 1, wherein the rapid heating element is an induction heating element.

6. The furnace according to claim 1, wherein the heating unit comprises a radiant heating tube.

7. The furnace according to claim 6, wherein the control circuit is configured to control at least one of the heating unit, the rapid heating element, or the radiant heating tube based on a property of the metal product.

8. The furnace according to claim 5, wherein the induction heating element is an inducer effective on non-magnetic metal products.

9. The furnace according to claim 1, further comprising:
a first portion configured to vary a temperature of the metal product, the first portion comprising at least one heating unit or a rapid heating element; and
a second portion configured to maintain the temperature of the metal product comprising at least one heating unit or a rapid heating element,
wherein the control circuit is configured to:
control the heating unit or the rapid heating element of the first portion to vary the temperature of the metal product, and,
control the heating unit or the rapid heating element of the second portion to vary or maintain the temperature of the metal product.

10. A method for controlling a temperature of a metal product in a furnace for the thermal treatment of the metal product, the furnace comprising a control circuit and a plurality of constitutive elements each having a thermal inertia characterized by one or more thermal inertia properties, the plurality of constitutive elements comprising walls delimiting at least partially the furnace, rolls configured for allowing a movement of the metal product along a determined path, at least one heating unit for heating the metal product when the metal product is at least partially in the furnace, and a rapid heating element for heating a metal product when the metal product is at least partially in the furnace, the rapid heating element being distinct from the heating unit, the method comprising:
obtaining, by the control circuit, a temperature of one or more of the plurality of constitutive elements of the furnace;
using said obtained temperature and a mass of one or more of the plurality of constitutive elements of the furnace to generate, by the control circuit, instructions for controlling heat output of at least one of the heating unit or the rapid heating element and for controlling a rate of the movement of the metal product along said determined path.

11. The method according to claim 10,
wherein the instructions for controlling heat output of at least one of the heating unit or the rapid heating element are further based on a specific heat capacity of one of the constitutive elements of the furnace.

12. The method according to claim 10,
wherein said obtaining, by the control circuit, a temperature of one or more of the plurality of constitutive elements of the furnace further comprises providing to the control circuit the temperature of the one or more of said rolls.

13. The method according to claim 10,
wherein said obtaining, by the control circuit, a temperature of one or more of the plurality of the constitutive elements of the furnace further comprises providing to the control circuit the temperature of the one or more of said walls.

14. The method according to claim 10, wherein the rapid heating element is an induction heating element.

15. The method according to claim 10,
wherein the at least one heating unit comprises a radiant heating tube, and wherein said instructions for controlling heat output of the at least one heating unit include instructions for controlling heat output of the radiant heating tube, and
said obtaining, by the control circuit, a temperature of one or more of the plurality of the constitutive elements of the furnace further comprises providing to the control circuit the temperature of the radiant heating tube.

16. A furnace for the thermal treatment of a metal product, comprising:
a plurality of constitutive elements comprising:
a plurality of walls delimiting at least partially the furnace;
a plurality of rolls configured for allowing a movement of the metal product along a determined path;

a heating unit configured for heating the metal product when the metal product is at least partially in the furnace; and a rapid heating element configured for heating the metal product when the metal product is at least partially in the furnace, the rapid heating element being distinct from the heating unit;

one or more temperature sensors arranged to measure a temperature of at least one of the constitutive elements, wherein the one or more temperature sensors includes a virtual sensor; and a control circuit coupled to the heating unit and the rapid heating element, wherein, based on a temperature and a mass of one or more of said constitutive elements of the furnace the control circuit is configured to:

send instructions to at least one of the heating unit or the rapid heating element for controlling heat output thereof; and control a rate of the movement of the metal product along said determined path.

* * * * *

UNITED STATES PATENT AND TRADEMARK OFFICE
CERTIFICATE OF CORRECTION

| | | |
|---|---|---|
| PATENT NO. | : 11,905,572 B2 | Page 1 of 1 |
| APPLICATION NO. | : 16/954713 | |
| DATED | : February 20, 2024 | |
| INVENTOR(S) | : A. Lhoest et al. | |

It is certified that error appears in the above-identified patent and that said Letters Patent is hereby corrected as shown below:

On the Title Page

Title and in the Specification, Column 1, Lines 1-4, change "KILN COMPRISING A CONTROL UNIT ASSOCIATED WITH THE THERMAL" to -- FURNACE COMPRISING A CONTROL UNIT ASSOCIATED WITH THERMAL --

Signed and Sealed this
Tenth Day of December, 2024

Katherine Kelly Vidal
*Director of the United States Patent and Trademark Office*